(12) United States Patent
Jenison et al.

(10) Patent No.: US 10,132,224 B2
(45) Date of Patent: Nov. 20, 2018

(54) MOUNTING CONFIGURATION FOR A HEAT DUCT IN AN ELECTRIC GENERATOR

(71) Applicant: Champion Engine Technology, LLC, Sussex, WI (US)

(72) Inventors: Leigh Jenison, Hartland, WI (US); Ian Schmit, Cedarburg, WI (US); James J. Dehn, Brookfield, WI (US); Mark J. Sarder, Waukesha, WI (US); Jie Li, Shaoxing (CN); Chaoming Xu, Yangzhou (CN); Defeng Chen, Shaoxing (CN); Shujuan Wang, Shaoxing (CN)

(73) Assignee: Champion Engine Technology, LLC, Sussex, WI (US)

( * ) Notice: Subject to any disclaimer, the term of this patent is extended or adjusted under 35 U.S.C. 154(b) by 168 days.

(21) Appl. No.: 14/703,336

(22) Filed: May 4, 2015

(65) Prior Publication Data

US 2016/0319728 A1    Nov. 3, 2016

(30) Foreign Application Priority Data

Apr. 29, 2015    (CN) .......................... 2015 1 0213270

(51) Int. Cl.
| | |
|---|---|
| *F01N 3/00* | (2006.01) |
| *F01N 13/00* | (2010.01) |
| *F01P 1/00* | (2006.01) |
| *F01N 13/18* | (2010.01) |
| *F02B 63/04* | (2006.01) |

(52) U.S. Cl.
CPC ....... *F01N 13/002* (2013.01); *F01N 13/1855* (2013.01); *F01N 13/1888* (2013.01); *F01P 1/00* (2013.01); *F01N 2260/022* (2013.01); *F01N 2260/20* (2013.01); *F01N 2590/10* (2013.01); *F02B 63/044* (2013.01); *Y02E 20/14* (2013.01)

(58) Field of Classification Search
CPC ............... F01N 13/002; F01N 13/1855; F01N 13/1888; F01P 1/00
USPC .......................................................... 60/298
See application file for complete search history.

(56) References Cited

U.S. PATENT DOCUMENTS 4,265,332 A * 5/1981 Presnall .................... F01N 3/05
                                                            165/52
4,608,946 A    9/1986 Tanaka et al.
(Continued)

FOREIGN PATENT DOCUMENTS

| CN | 1800600 A | 7/2006 |
|---|---|---|
| CN | 2890369 Y | 4/2007 |
| CN | 204024810 U | 12/2014 |

*Primary Examiner* — Jason Shanske
(74) *Attorney, Agent, or Firm* — Ziolkowski Patent Solutions Group, SC

(57) ABSTRACT

An exhaust pipe mounted heat duct in an electrical generator includes an exhaust pipe coupleable to an internal combustion engine of the electrical generator to receive exhaust therefrom, the exhaust pipe having a first support member and a second support member extending outwards from the exhaust pipe. The exhaust pipe mounted heat duct also includes a heat duct assembly comprising a first component and a second component, the first component mounted to the first support member and a second component mounted to the second support member, the first component coupled to the second component to substantially surround the exhaust pipe.

16 Claims, 7 Drawing Sheets

(56) References Cited

U.S. PATENT DOCUMENTS

| | | | |
|---|---|---|---|
| 4,702,201 A | | 10/1987 | Odo et al. |
| 5,482,681 A | * | 1/1996 | Sager, Jr. .............. F01N 3/2857 |
| | | | 422/177 |
| 5,899,174 A | * | 5/1999 | Anderson ............... F02B 63/04 |
| | | | 123/2 |
| 6,376,944 B1 | | 4/2002 | Grizzle, Jr. et al. |
| 6,784,574 B2 | | 8/2004 | Turner et al. |
| 7,007,720 B1 | * | 3/2006 | Chase ..................... F16L 59/12 |
| | | | 138/110 |
| 7,314,397 B2 | | 1/2008 | Sodemann et al. |
| 7,642,665 B2 | * | 1/2010 | Konop ................. H02K 7/1815 |
| | | | 123/2 |
| 2006/0214425 A1 | * | 9/2006 | Yamamoto ................ F01P 1/02 |
| | | | 290/1 A |
| 2012/0187679 A1 | * | 7/2012 | Takita ..................... F02B 63/04 |
| | | | 290/2 |
| 2013/0187392 A1 | | 7/2013 | Janscha et al. |

* cited by examiner

US 10,132,224 B2

MOUNTING CONFIGURATION FOR A HEAT DUCT IN AN ELECTRIC GENERATOR

BACKGROUND OF THE INVENTION

Standby generators provide a convenient source of backup electricity for homes and businesses when power outages occur in the utility grid. Standby generators may comprise a prime mover that drives an alternator to produce electricity. The prime mover may be an internal combustion engine configured to operate on a liquid fuel such as diesel and gasoline or an alternative fuel such as propane and natural gas.

Standby generators are typically housed in an enclosure for convenience and protection. However, enclosures can trap heat generated from the prime mover and the alternator, causing higher operating temperatures and reduced efficiency. While a fan may be placed within the enclosure to expel heat from the engine and the alternator, large fans not only increase the noise of the generator, but can also decrease the electrical output of the generator. Heat generated within the enclosure can adversely affect the alternator performance.

An improved cooling system for standby generators would lower the temperature within the enclosure, and in particular, across the alternator, thereby improving the overall performance of the generator.

BRIEF DESCRIPTION OF THE INVENTION

In accordance with one aspect of the invention, an exhaust pipe mounted heat duct in an electrical generator includes an exhaust pipe coupleable to an internal combustion engine of the electrical generator to receive exhaust therefrom, the exhaust pipe having a first support member and a second support member extending outwards from the exhaust pipe. The exhaust pipe mounted heat duct also includes a heat duct assembly comprising a first component and a second component, the first component mounted to the first support member and a second component mounted to the second support member, the first component coupled to the second component to substantially surround the exhaust pipe.

In accordance with another aspect of the invention, an air duct mounting configuration in an electrical generating apparatus having an alternator is provided. The air duct mounting configuration includes an exhaust pipe operatively coupled to an internal combustion engine, the exhaust pipe having at least one connecting member extending outwards from the exhaust pipe. The air duct mounting configuration also includes an air duct assembly comprising a first component and a second component, the first component mounted to the at least one connecting member and the first and second component each having a first end and a second end along the length of the air duct, wherein the first ends are coupled together and the second ends are coupled together such that the air duct assembly surrounds the exhaust pipe forming a cooling air path between the air duct and exhaust pipe along a length of the alternator in the electrical generating apparatus.

In accordance with another aspect of the invention, a method of assembling an air duct for a generator includes providing a multi-chamber generator enclosure, an engine within the enclosure, and an alternator driven by the engine and positioned in at least one of the chambers. The method also includes providing an exhaust system for the engine having a first connecting member extending outwards from the exhaust and providing an air duct assembly comprising an outer section and an inner section, the outer section coupleable to the inner section to form an enclosure through which the exhaust system extends. The method further includes coupling the inner section to the first connecting member of the exhaust system, coupling the exhaust system operatively to the engine so that the exhaust system extends from the engine through the at least one chamber having the alternator, and coupling the outer section to the inner section so that the air duct substantially surrounds the exhaust system in the at least one chamber having the alternator to create a cooling air path between the exhaust system and the air duct.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a home or business standby generator. However, it will be appreciated by those skilled in the art that the invention is equally applicable for use with portable or other generators. Moreover, the invention will be described with respect to heat and air flow management within an enclosure for a generator. However, one skilled in the art will further appreciate that the invention is equally applicable for use with respect to heat and air flow management within an enclosure having a heat generating prime mover, such as an internal combustion engine.

Figure 1:
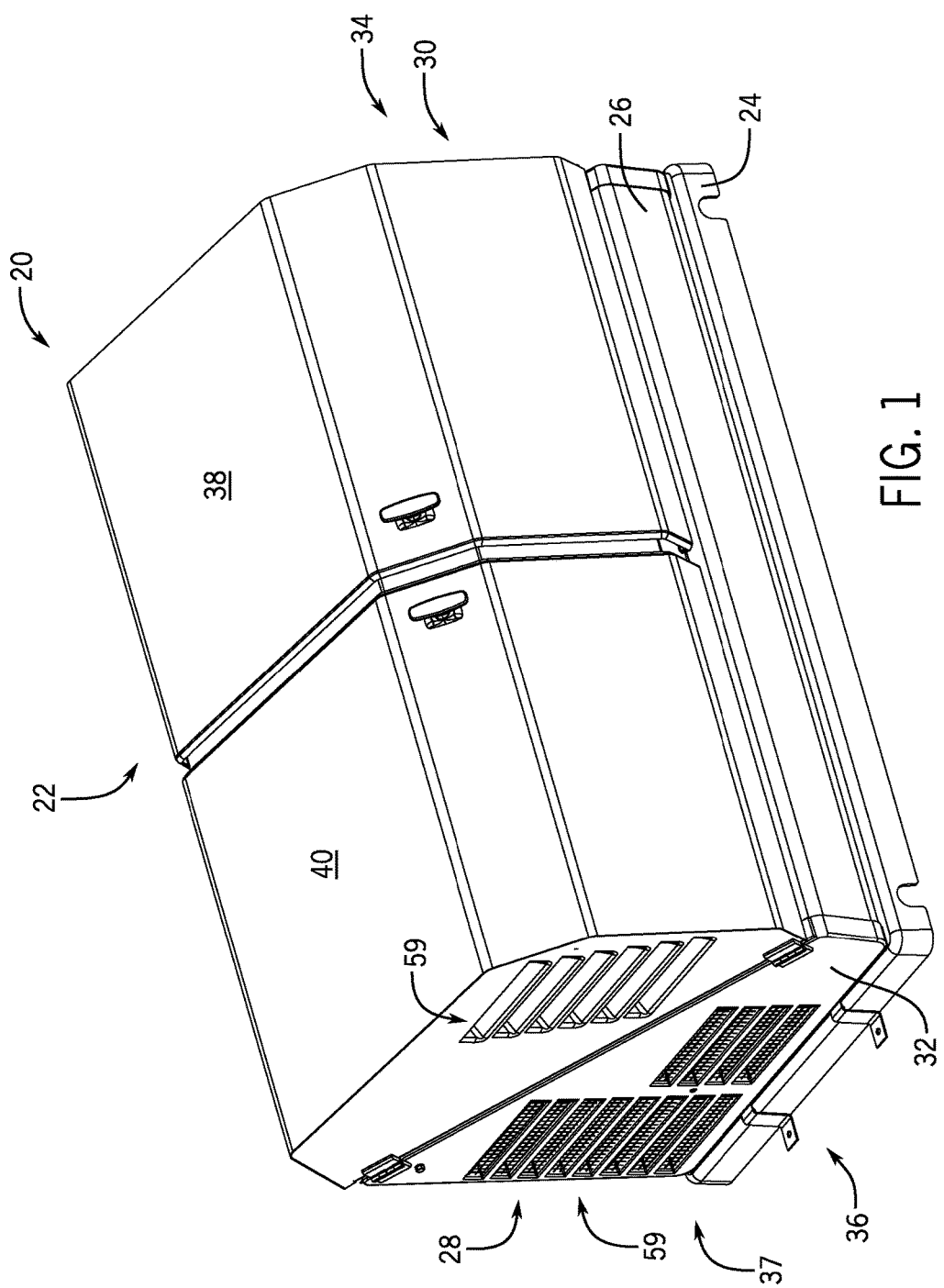
FIG. 1 is a front, left side perspective view of a generator incorporating the present invention.

Referring to FIG. 1, a standby generator 20 is shown, according to embodiments of the invention. The standby generator 20 couples to an electrical distribution panel of a building and is configured to provide a backup supply of electricity in case power outages occur in the utility grid. The standby generator 20 has a prime mover that drives an alternator to produce electrical power. The prime mover may comprise an internal combustion engine having a crankshaft operatively coupled to a shaft of the alternator. The generator and alternator are referred to as an engine-generator set.

In accordance with an exemplary embodiment of the invention, the standby generator 20 has an enclosure 22 to provide protection against weather and to insulate noise emanating from the generator. The enclosure 22 has a rectangular base 24 to support an engine-generator set. A front wall 26 and a back wall 28 extend vertically from the base 24 along the length of the enclosure 22. A first side wall 30 located on the right side and a second side wall 32 located on the left side extend vertically from the base 24 at a respective first end 34 and second end 36 of the enclosure 22. Together, the base 24, first and second side walls 30 and 32, and the front and back walls 26 and 28 form an enclosure frame 37. The enclosure 22 also has a first door 38 and a second door 40 that cover the enclosure 22 when the doors are closed. In one embodiment of the invention, a generator has an enclosure 22 comprising a frame assembly 37 and a pair of opposing, substantially symmetrical doors 38, 40 enclosing the frame 37 on a top side of the generator.

Figure 2:
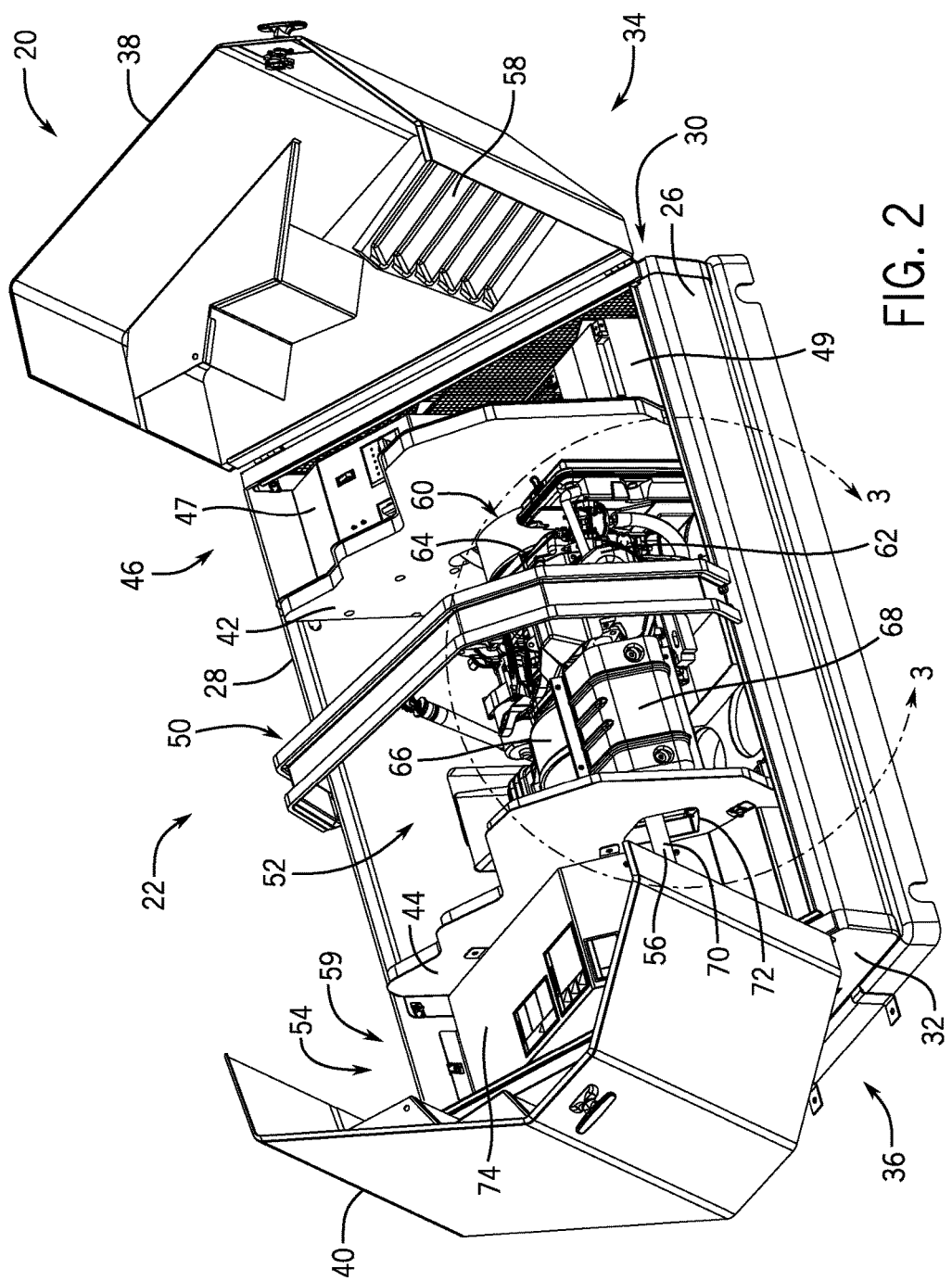
FIG. 2 is a perspective view of the generator of FIG. 1 with doors of the enclosure in an open position.

Referring to FIG. 2, standby generator 20 is shown with a first door 38 and second door 40 in an open position, in accordance with an embodiment of the invention. The standby generator 20 may be separated into three chambers by a first partition wall 42 and a second partition wall 44 that extend across the enclosure 22 from the front wall 26 to the back wall 28. A control chamber 46 is located between the first side wall 30 and the first partition wall 42. The control chamber 46 houses a control system 47 to operate the generator, an air filter to filter intake air to the engine, and a battery 49 for starting the engine, as well as other ancillary components. A power train chamber 50 is located between the first partition wall 42 and the second partition wall 44 to house the engine-generator set 52 and related components. An exhaust chamber 54 is located between the second partition wall 44 and the second side wall 32. The exhaust chamber 54 houses exhaust system components 56 and other ancillary components and ejects exhaust to the environment.

The control chamber 46 receives cooling air from the environment through a first set of louvers 58 in the first door 38 to provide an inlet for the cooling air. The louvers 58 provide cooling air to cool the control system 47 and other components within control chamber 46 and direct air to the power train chamber 50 through openings 60 in the first partition wall 42. The openings 60 are adjacent the internal combustion engine 62 and an engine fan 64 that drives the cooling air through the openings 60 and over the engine 62. The engine fan 64 provides a driving force to pull air into the control chamber 46 from the environment and/or a separate fan may be located in the control chamber 46. The control chamber 46 also insulates noise that may emanate through the openings 60 in the first partition wall 42.

The power train chamber 50 houses the engine-generator set 52 which preferably includes an internal combustion engine 62 and an alternator 66 driven by the internal combustion engine 62. The internal combustion engine 62 may include one or more cylinders with each cylinder having a piston slidably positioned within each cylinder. Combustible fuel is provided to each cylinder through a respective intake valve that is then compressed and ignited causing reciprocal motion of the pistons. The reciprocal motion of the pistons is converted to rotational motion of a crankshaft. The crankshaft is coupled to an alternator shaft to drive the alternator 66 and provide electrical energy for distribution from the standby generator 20.

In an exemplary embodiment of the invention, the engine-generator set 52 has a horizontal shaft arrangement and is positioned so that the internal combustion engine 62 is located toward the first end 34 of the enclosure 22 from the alternator 66. The engine fan 64 is driven by the crankshaft and faces the control chamber 46. The engine fan 64 pulls air through the first partition wall 42 to cool the engine 62 and blows the air through a heat duct assembly 68 into the exhaust chamber 54. The alternator 66 may have an exhaust fan driven by the alternator shaft and located opposite the internal combustion engine 62. The exhaust fan pulls cooling air axially through the alternator 66 and drives it into the exhaust chamber 54. In one embodiment of the invention, the heat duct assembly 68 may direct cooling air expelled from the engine 62 into the exhaust chamber 54 so that it bypasses the exhaust fan to reduce fan size and power consumption. Accordingly, the heat duct assembly 68 may be in a generator having an enclosure 22 with multiple chambers to separate components and manage heat transfer therein.

The exhaust chamber 54 houses exhaust system components 56 and receives expelled cooling air from the alternator 66 and internal combustion engine 62 before venting the exhaust to the environment. The second partition wall 44 may have openings for receiving the expelled cooling air from the alternator 66 and the internal combustion engine 62. The exhaust chamber 54 may also house an exhaust fan which may extend through one of the openings in the second partition wall 44. The exhaust chamber 54 may allow exhaust to dissipate within the chamber before expelling the exhaust safely to the environment. The cooling air may be expelled to the environment through openings in the chamber walls. As shown in FIG. 1, a second set of louvers 59 are provided in the second door 40 to provide openings to expel the cooling air, and/or such vents may be located in the rear wall 28, as show in FIG. 2. The exhaust chamber 54 also insulates noise emanating from the engine 62 and alternator 66.

The exhaust system 56 may have an exhaust pipe 70 for the internal combustion engine 62 which may extend through one of the openings 72 in the second partition wall 44. The exhaust pipe 70 is coupled to the internal combustion engine 62 to remove combustion gases and may deliver the combustion gases to a muffler located within a muffler box 74. The muffler box 74 is preferably located in the lower back corner of the exhaust chamber 54 and may have an opening in the front for the exhaust pipe 70. The exhaust pipe 70 may make a ninety degree bend before entering the muffler box 74 so that cooling air from the engine 62 can bypass the muffler box 74 to exit through the side of the enclosure 22. The muffler box 74 may prevent combustion gases from filling the exhaust chamber 54 and direct exhaust out the back of the enclosure 22 and away from operators at the front.

Figure 3:
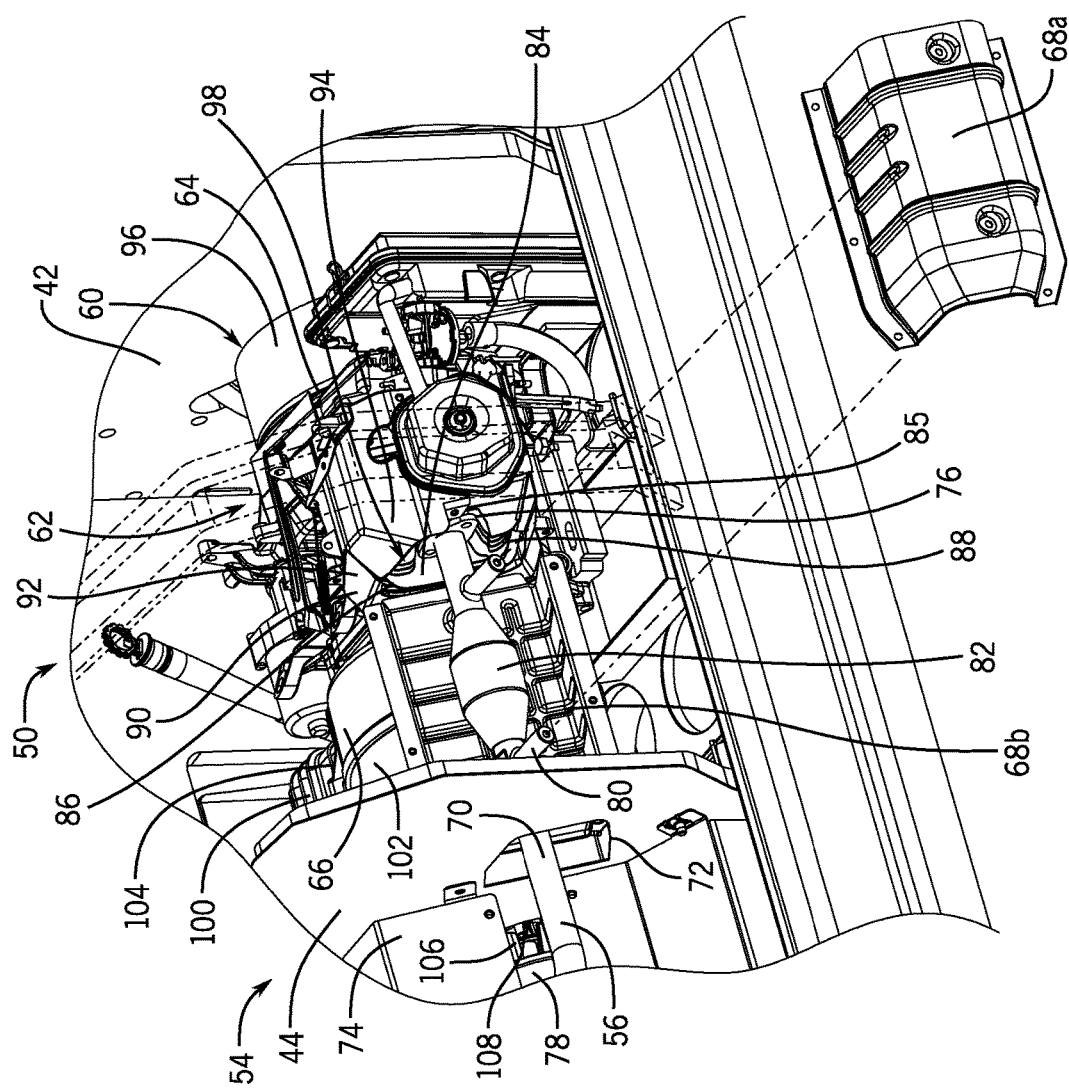
FIG. 3 is a detailed partial perspective view of the generator of FIG. 2 taken along line 3-3 with a heat shield exploded therefrom.
Figure 4:
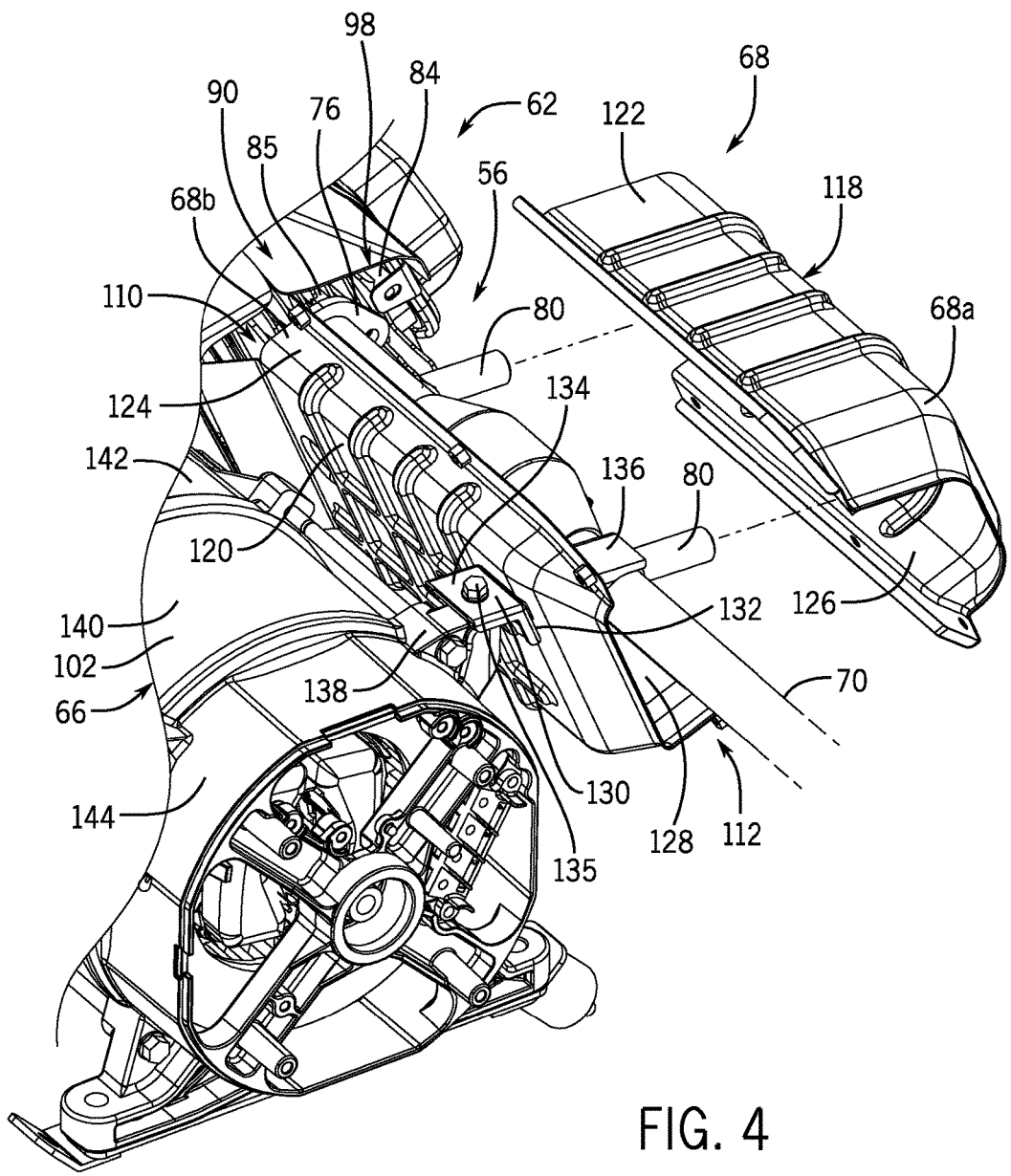
FIG. 4 is a perspective view from an end of the generator depicting an alternator and exhaust system of the generator with a heat shield exploded off the exhaust.

Referring now to FIG. 3, a detailed view of a section taken along line 3-3 of FIG. 2 shows a power train chamber 50 with a portion of the heat duct assembly 68 as removed from the exhaust system 56, according to an embodiment of the invention. The exhaust system 56 couples to the internal combustion engine 62 to remove exhaust gases after combustion. The exhaust system 56 may have an exhaust pipe 70 with a mounting flange 76 for mounting to the internal combustion engine 62. The exhaust pipe 70 extends outward from the engine 62 in the direction of the exhaust chamber 54 and extends through an opening 72 in the second partition wall 44 to the exhaust chamber 54. Within the exhaust chamber 54, the exhaust pipe 70 may make a ninety degree bend to enter the muffler box 74. A muffler 78 is located within the muffler box 74 and couples to the exhaust pipe 70. As shown in FIGS. 3 and 4, the exhaust pipe 70 may have connecting members 80 extending radially from the pipe for coupling the heat duct portion 68a to the pipe within the power train chamber 50. The exhaust system 56 may have an exhaust component 82 which may comprise a resonator chamber, catalytic converter, muffler, expansion chamber or a heat sink, and the exhaust component 82 may be located within the power train chamber and surrounded by the heat duct assembly 68.

The exhaust system 56 couples to a cylinder head 84 of the internal combustion engine 62. The cylinder head 84 is coupled to a cylinder block 86 and the cylinder head 84 may have an exhaust port to expel exhaust gases generated within the cylinders. The cylinder head 84 has a mounting flange 85 around the exhaust port that mates with the mounting flange 76 of the exhaust pipe 70. The cylinder block 86 and cylinder head 84 may have cooling fins 88 located around their periphery for dissipating heat generated during combustion. The engine 62 may have engine covers 90 comprising a cylinder block cover 92 and a cylinder head cover 94. The engine covers 90 may have a first opening facing the first end of the enclosure and a second opening facing the second end of the enclosure to provide an inlet and an outlet for cooling air.

As best shown in FIG. 3, the internal combustion engine 62 may have an engine fan 64 that drives cooling air through the inlet and outlet in the engine covers. The engine fan 64 is driven by the crankshaft and is located on the opposite side of the engine 62 from the alternator 66. The engine fan 64 may be positioned within an opening 60 in the first partition wall 42, and a shroud 96 may be coupled to the first partition wall 42 to surround the engine fan 64 and define the opening 60. The engine fan 64 may create a first stream of air within the enclosure 22 that is driven from the control chamber 46 within the engine covers 90 and over the cooling fins 88 to cool the engine 62.

The heat duct assembly 68 may be located adjacent the cooling air outlet 98 to direct the first stream of air from the engine 62 into the exhaust chamber 54. The heat duct assembly 68 may be located within the power train chamber 50 and may extend from the internal combustion engine 62 to the exhaust chamber 54. The heat duct assembly 68 may provide a heat shield for the exhaust pipe 70 to reduce heat transfer from the pipe into the power train chamber 50. The heat duct assembly 68 may direct the first stream of air over the exhaust pipe 70 to cool the pipe. The heat duct assembly 68 may reduce the amount hot air from the engine 62 circulating within the power train chamber 50 so that components within the chamber operate at cooler temperatures. In one embodiment of the invention, the heat duct assembly 68 may direct heat from the engine 62 away from the alternator 66 so that the alternator operates at cooler temperatures.

The power train chamber 50 may have an air duct 100 for supplying cooling air to the alternator 66. The alternator 66 may be located in an alternator housing 102 with an air passage 104 for receiving the cooling air. The air passage 104 may be coupled to the air duct 100 that leads to an opening in the back wall of the enclosure 22 to receive cooling air from the environment. The cooling air may be drawn into the alternator housing 102 by the exhaust fan 106. The exhaust fan 106 may be driven by the alternator shaft and be located on the opposite side of the alternator 66 from the engine 62. The exhaust fan 106 may create a second stream of air within the enclosure 22 by drawing cooling air in through the air duct 100 and axially through the alternator 66 to cool the alternator 66. The second stream of air may be expelled into the exhaust chamber 54 through an opening 108 in the second partition wall 44, and the exhaust fan 106 may extend into the exhaust chamber 54 through the opening 108.

Referring to FIG. 4, a more detailed top side view shows portions of the generator disassembled. The heat duct assembly 68 includes portions 68*a* and 68*b*. An inlet 110 and an outlet 112 are on opposite ends of the exhaust pipe 70 so that the inlet 110 is in line with the cooling air outlet 98 of the engine covers 90. The heat duct assembly 68 comprises first component 68*a* and second component 68*b* that couple together to surround the exhaust pipe 70. The heat duct assembly 68 has a front surface 118 as part of the first component 68*a* and a back surface 120 as part of the second component 68*b*. The first component 68*a* and the second component 68*b* each has a first side piece 122, 124 and a second side piece 126, 128, respectively, that extend from the respective front surface 118 and back surface 120 along the length of the heat duct assembly 68. The first side pieces 122, 124 mate together and the second side pieces 126, 128 mate together so that the first component 68*a* and the second component 68*b* encircle the exhaust pipe 70.

The heat duct assembly 68 may be located near the front of the enclosure 22 because the internal combustion engine 62 may be tilted toward the front of the enclosure 22 for accessibility to the cylinder head 84. Accordingly, the heat duct assembly 68 may be positioned in front of the alternator 66 and may be oriented on the exhaust system 56 so that the back surface 120 faces the alternator 66. The back surface 120 may be evenly spaced from the alternator 66 so that the first side piece 124 and second side piece 128 along the back surface 120 are equal distance from the alternator shaft. The front surface 118 of the heat duct assembly 68 may be parallel to the back surface 120 and face the upper front end of the enclosure 22.

The first component 68*a* may have a first side piece 122 that extends horizontally from the front surface 118 and a second side piece 126 that extends perpendicular from the front surface 118. The second component 68*b* may have a first side piece 124 and a second side piece 128 that extend perpendicular from the back surface 120. The corners between the side pieces and the respective front surface 118 and back surface 120 may be rounded and the corners of the first component 68*a* may have a larger radius than the corners of the second component 68*b*.

The heat duct assembly 68 may have a bracket 130 extending outwards from the back surface 120 for coupling the duct to the alternator housing 102. The bracket 130 is preferably angled with a first arm 132 mounted to the back surface 120 and a second arm 134 that extends horizontally from the back surface 120 when the duct is mounted on the exhaust. The second arm 134 has an opening for receiving a fastener 135 to couple to the alternator housing 102. The bracket 130 may have edges that extend perpendicular to the first arm 132 and second arm 134 for added structural integrity.

The bracket 130 and the back surface 120 have openings through which an exhaust support 136 extends. The openings may be slots and the exhaust support 136 may be a bracket that couples the exhaust pipe 70 to the alternator housing 102. The exhaust support 136 extends to the alternator housing 102 next to the second arm 134 so that the exhaust support 136 and second arm 134 are coupled to the alternator housing 102 at the same location. In another embodiment, the bracket 130 may be positioned adjacent the opening in the back surface 120 without an opening in the first arm 132.

The exhaust support 136 preferably extends outward from the exhaust pipe 70 and couples to the alternator housing 102. The exhaust support 136 may be a straight bracket with a first end that mounts tangent on the exhaust pipe and the second end may have an opening for a fastener 135 to couple the support to the alternator housing 102. The exhaust support 136 may have edges that are bent perpendicular to the main surface for added strength. The edges may extend along the length of the exhaust support 136 but short of the first end so the surface of the support may couple to the exhaust pipe 70. The exhaust support 136 may extend through the slot provided in the second component 68*b* and extend to the alternator 66.

The exhaust support 136 may extend horizontally and adjacent the heat duct bracket 130 so that the exhaust support 136 and the heat duct bracket 130 may be coupled together to the alternator housing 102. The exhaust support 136 may fit within the edges of the heat duct bracket 130 and lie flush against the heat duct bracket 130. The second end of the exhaust support 136 may have an opening provided for receiving the same fastener 135 used to couple the heat duct bracket 130 to the alternator housing 102. The opening in the exhaust support 136 may comprise a first slot and the opening in the heat duct bracket 130 may comprise a second slot. The first and second slots may be positioned at right angles to each other to ensure sufficient alignment in the respective openings for receiving the fastener 135.

The exhaust support 136 and the heat duct bracket 130 may be coupled together to an alternator bracket 138. The alternator bracket 138 may be integral to one used to hold the alternator housing 102 together. The housing may include a stator cover 140 between a crankcase cover 142 and an end cover 144. The crankcase cover 142 and the end cover 144 may have brackets that receive bolts to clamp the housing together. A bracket on the end cover 144 may be configured to receive an additional fastener 135 to couple the heat duct bracket 130 and the exhaust support 136 to the alternator housing 102. The alternator bracket 138 may have a horizontal flat surface that mates flush with the heat duct bracket 130 and the exhaust support 136.

Figure 5:
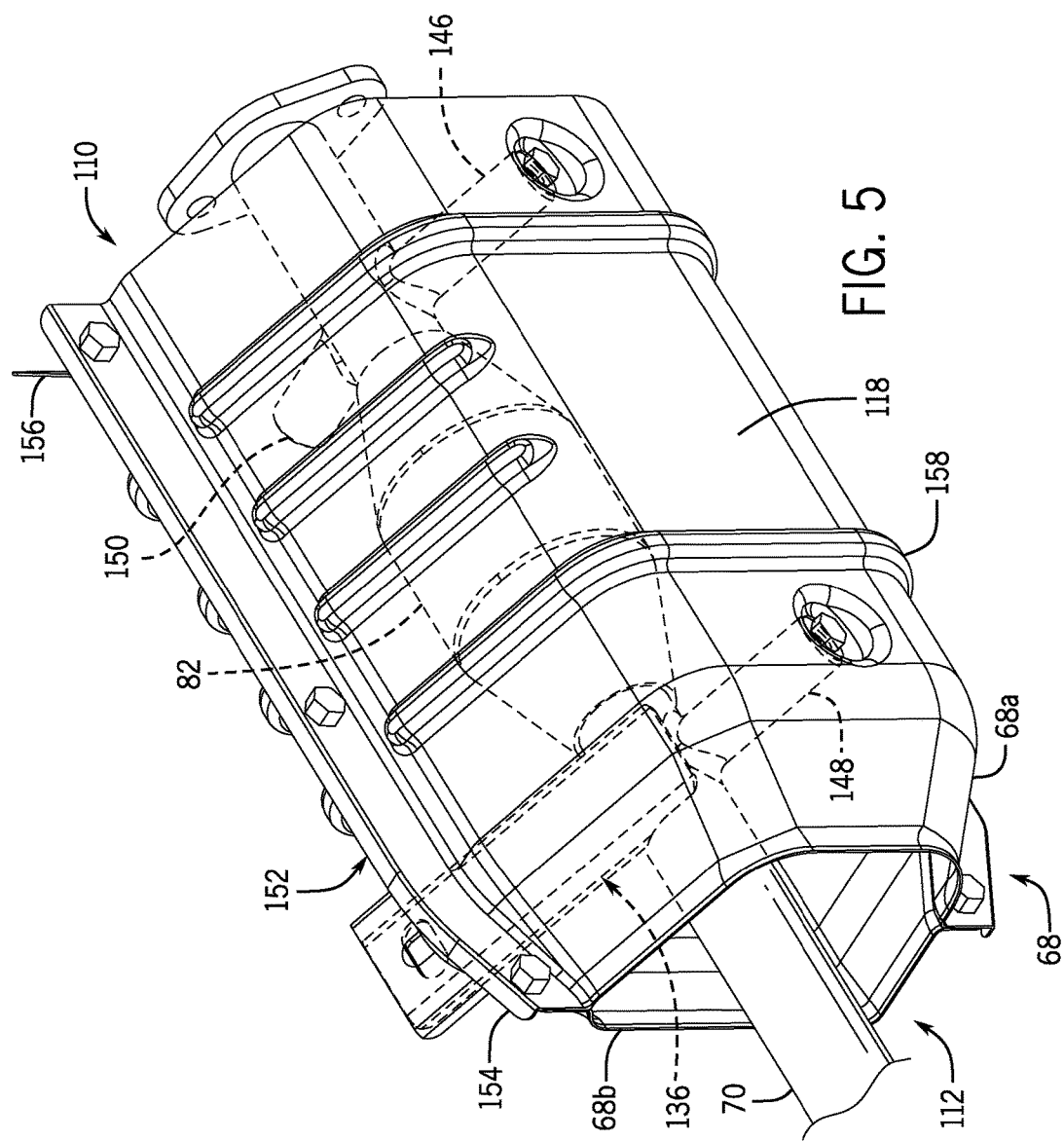
FIG. 5 is a front top perspective view of a heat management system of the generator.
Figure 6:
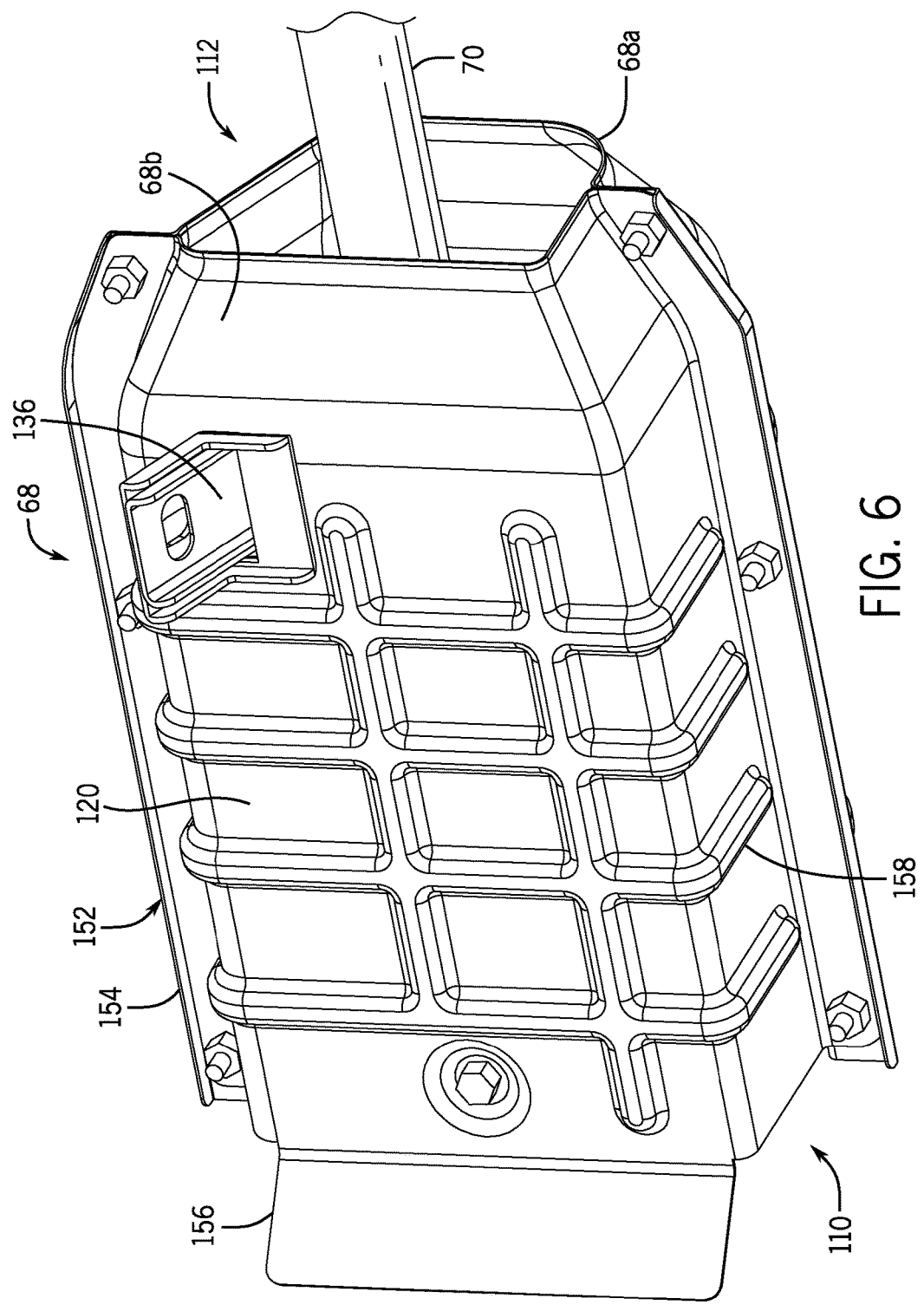
FIG. 6 is a back bottom perspective view of the heat management system of FIG. 5.

Referring now to FIGS. 5 and 6, heat duct assembly 68 is shown coupled to exhaust pipe 70, in accordance with an embodiment of the invention. The exhaust pipe 70 preferably has supporting members that couple the heat duct assembly 68 to the exhaust pipe 70. A first supporting member 146 and a third supporting member 148 may extend outward from the exhaust pipe 70 horizontally to the front surface 118 of the heat duct assembly 68. The first supporting member 146 and third supporting member 148 may be located on either side of an exhaust component 82 which may comprise a resonator chamber, catalytic converter, muffler, expansion chamber or a heat sink. A second supporting member 150 may extend outward from the exhaust pipe 70 to the back surface 120 of the heat duct assembly 68. The second supporting member 150 may be located upstream of the exhaust component 82 and may extend toward the alternator 66 so that it is perpendicular to the back surface 120. The first supporting member 146 and third supporting member 148 may couple to the first component 68*a* while the second supporting member 150 and the exhaust support 136, also referred to as a fourth supporting member, couple to the second component 68*b*.

The heat duct assembly 68 may be oblong having an inlet 110 and an outlet 112 at the ends to direct the first stream of air into the exhaust chamber 54. The heat duct assembly 68 may have a first component 68*a* and a second component 68*b* that couple to each other along two sides of the duct to fit around the exhaust pipe 70. The first component 68*a* and second component 68*b* may couple together by a first and second pair of mating flanges 152 located along the length of the duct. Each component may have a first flange on a first side and a second flange on a second side of the duct that mate with a corresponding flange of the other component. The flanges 152 may comprise a flat surface extending outwards from the components and one of each mating pair may have lip 154 along the outer edge to guide the mating flange into position. The flanges 152 may have openings for receiving fasteners and a nut or a boss with a tapped hole may be affixed to the openings to receive a bolt as the fastener.

The heat duct assembly 68 may fit around the exhaust pipe 70 so that the inlet 110 corresponds to the cooling air outlet 98 of the engine covers 90. The heat duct assembly 68 may be mounted on the exhaust pipe 70 so that the inlet 110 is near the cooling air outlet 98 of the engine 62 and spaced apart from the engine 62 so that the heat duct assembly 68 does not vibrate against the engine 62. The first component 68*a* preferably has an inlet profile that matches the outlet opening in the cylinder head cover 94. The second component 68*b* preferably has a directional member 156 that extends beyond the inlet 110 and flares outward to direct the first stream of air into the heat duct assembly 68. The directional member 156 may extend from the back surface 120 substantially to the cylinder block cover 92 and extends along the width of the back surface 120. In another embodiment of the invention, the inlet 110 of the heat duct assembly may couple directly to one or more of the cylinder block cover 92 and cylinder head cover 94.

The heat duct assembly 68 may have an outlet profile that corresponds to the profile of the opening 72 (FIG. 2) in the second partition wall 44. The outlet 112 may be tapered into the duct which may aid in directing the first stream of air into the exhaust chamber 54. The heat duct assembly 68 may be coupled to the exhaust pipe 70 so that the outlet 112 is spaced apart from the opening 72 (FIG. 2) in the second partition wall 44. In other embodiments of the invention, the heat duct assembly 68 is coupled to the exhaust pipe 70 so that the outlet 112 is flush with the second partition wall 44 or extends through the opening 72 (FIG. 2) in the second partition wall 44. In some embodiments of the invention, the heat duct assembly 68 may have a uniform profile along its length and may comprise a tube of circular, triangular, rectangular or other cross sectional shapes.

The first component 68*a* and the second component 68*b* may be made of sheet metal. The first component 68*a* and the second component 68*b* may be formed by stamping the sheet metal to form the contours of the components. The sheet metal may include strengthening ribs 158 extending from the surface of the heat duct assembly 68. The strengthening ribs 158 may comprise a V-shaped or radiused indentation formed by an embossing process. The strengthening ribs 158 may extend from the first of the flanges 152 to the second of the flanges 152, and the strengthening ribs 158 may extend along the length of the components 68*a*, 68*b*. The strengthening ribs 158 along the length of the components 68*a*, 68*b* may intersect the strengthening ribs 158 along the width of the components 68*a*, 68*b*.

Figure 7:
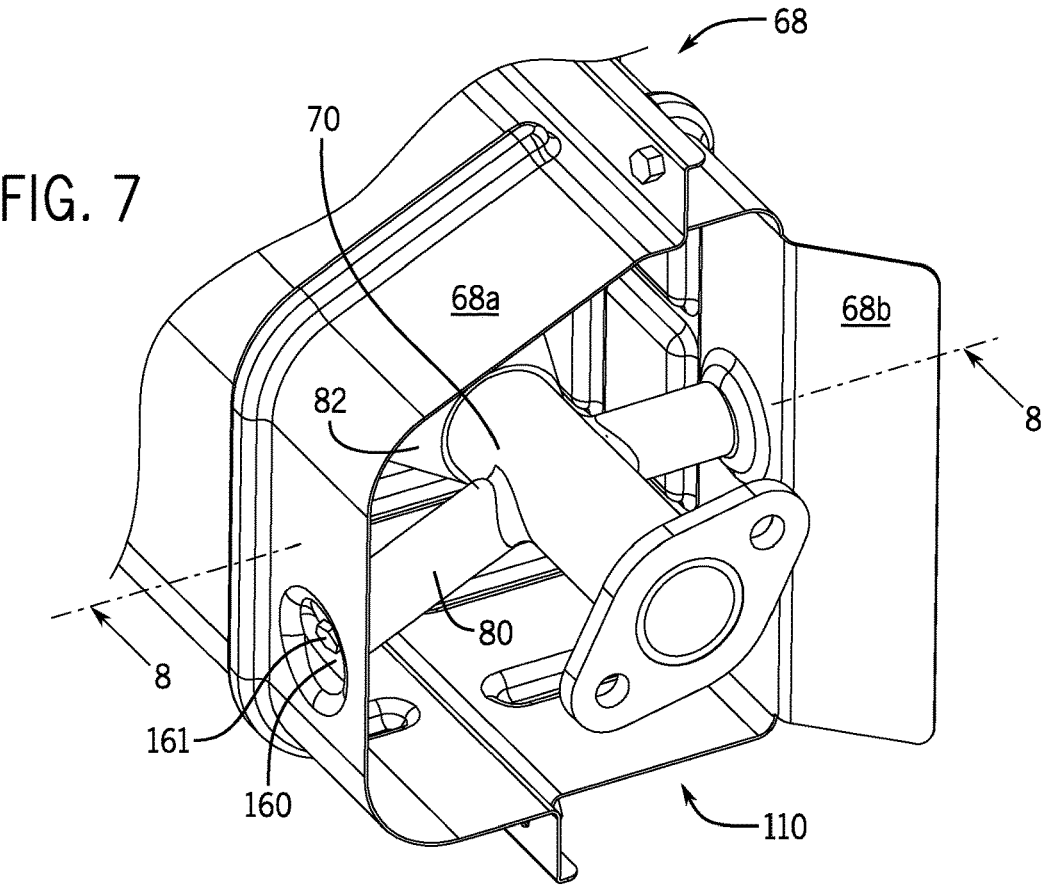
FIG. 7 is a top perspective view of an inlet to the heat management system of FIGS. 5 and 6.
Figure 8:
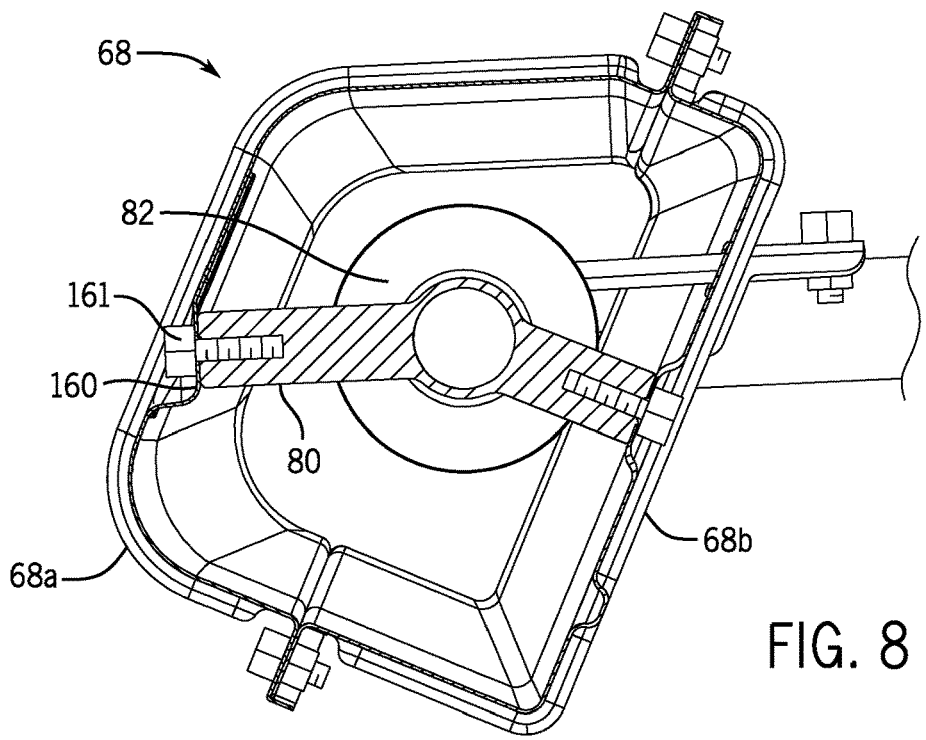
FIG. 8 is a cross-sectional view of the heat management system of FIGS. 5-7 taken along line 8-8 of FIG. 7.

Referring to FIGS. 7 and 8, opposite ends of the exhaust and heat duct assembly is shown. An exhaust pipe 70 may have one or more connecting members 80 extending radially outwards from the pipe for coupling the heat duct assembly 68 to the exhaust pipe 70, in accordance with an embodiment of the invention. The exhaust pipe 70 has connecting members 80 at one or more locations along the length of the exhaust pipe 70 to support the inlet 110 and outlet 112 of the heat duct assembly 68. The connecting members 80 may comprise rods having a first end welded to the exhaust pipe and a second end fastened to the heat duct assembly 68. The second end may have a flat face perpendicular to the axis of the rod and a tapped hole for receiving a bolt. The connecting members 80 may also have sufficient length so that the heat duct assembly 68 fits around an exhaust component 82.

The heat duct assembly 68 may have indentations 160 along the surface that provide fastening locations to couple the heat duct assembly 68 to the connecting members 80. The indentations 160 create a surface parallel to the end of the support rod and have an opening for receiving a fastener 161. The indentations 160 allow a fastener 161 to mate flush with the surface of the heat duct assembly 68 when the heat duct assembly 68 is fastened to the connecting members 80. The indentations 160 may also provide a recess for the fastener head so that the head does not extend beyond the outer surface of the heat duct assembly 68. The heat duct assembly 68 may comprise fasteners for coupling the heat duct assembly 68 to the exhaust pipe 70 and for coupling the first component 68a to the second component 68b.

Beneficially, embodiments of the invention provide a mounting configuration for a heat duct assembly used in a standby generator. The mounting configuration may provide for a heat duct assembly positioned within a generator enclosure configured to improve air flow and heat management of the generator. The mounting configuration allows the heat duct assembly to mount around an exhaust pipe so that the inlet is positioned to receive cooling air exhaust from an engine and the outlet delivers the cooling air to an exhaust chamber within the enclosure. The mounting configuration also provides for ease in assembly, manufacturing, and structural integrity. The improved heat management and air flow reduces the size requirements and power consumption of generators within the enclosure. The system allows for lower operating temperatures and increase in efficiency of the engine-generator set.

Therefore, according to one embodiment of the invention, an exhaust pipe mounted heat duct in an electrical generator includes an exhaust pipe coupleable to an internal combustion engine of the electrical generator to receive exhaust therefrom, the exhaust pipe having a first support member and a second support member extending outwards from the exhaust pipe. The exhaust pipe mounted heat duct also includes a heat duct assembly comprising a first component and a second component, the first component mounted to the first support member and the second component mounted to the second support member, the first component coupled to the second component to substantially surround the exhaust pipe.

According to another embodiment of the invention, an air duct mounting configuration in an electrical generating apparatus having an alternator is provided. The air duct mounting configuration includes an exhaust pipe operatively coupled to an internal combustion engine, the exhaust pipe having at least one connecting member extending outwards from the exhaust pipe. The air duct mounting configuration also includes an air duct assembly comprising a first component and a second component, the first component mounted to the at least one connecting member and the first and second component each having a first end and a second end along the length of the air duct, wherein the first ends are coupled together and the second ends are coupled together such that the air duct assembly surrounds the exhaust pipe forming a cooling air path between the air duct and exhaust pipe along a length of the alternator in the electrical generating apparatus.

According to yet another embodiment of the invention, a method of assembling an air duct for a generator includes providing a multi-chamber generator enclosure, an engine within the enclosure, and an alternator driven by the engine and positioned in at least one of the chambers. The method also includes providing an exhaust system for the engine having a first connecting member extending outwards from the exhaust and providing an air duct assembly comprising an outer section and an inner section, the outer section coupleable to the inner section to form an enclosure through which the exhaust system extends. The method further includes coupling the inner section to the first connecting member of the exhaust system, coupling the exhaust system operatively to the engine so that the exhaust system extends from the engine through the at least one chamber having the alternator, and coupling the outer section to the inner section so that the air duct substantially surrounds the exhaust system in the at least one chamber having the alternator to create a cooling air path between the exhaust system and the air duct.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An exhaust pipe mounted heat duct in an electrical generator comprising:
   an exhaust pipe coupleable to an internal combustion engine of the electrical generator to receive exhaust therefrom, the exhaust pipe having a first support member and a second support member extending outwards from the exhaust pipe; and
   a heat duct assembly comprising a first component and a second component, the first component mounted to the first support member and the second component mounted to the second support member, the first component coupled to the second component to substantially surround the exhaust pipe;
   wherein the first and second component have openings for fasteners to couple to the respective first and second support member.

2. The exhaust pipe mounted heat duct of claim 1, wherein the first component and second component are coupled together at two ends to encircle the exhaust pipe and create a flow path between the exhaust pipe and the heat duct to remove expelled cooling air from the engine.

3. The exhaust pipe mounted heat duct of claim 2, wherein the first component and second component comprise flanges at each end for coupling the first component to the second component.

4. The exhaust pipe mounted heat duct of claim 1, wherein the second component comprises a bracket for coupling to an alternator of the electrical generator.

5. The exhaust pipe mounted heat duct of claim 1, wherein the exhaust pipe includes a support bracket coupled to an alternator of the electrical generator, and the second component includes an opening through which the support bracket for the exhaust pipe extends.

6. The exhaust pipe mounted heat duct of claim 1, wherein the exhaust pipe has a third support member and a fourth support member extending outward from the exhaust pipe, and the first component is mounted to the third support member and the second component is mounted to the fourth support member.

7. The exhaust pipe mounted heat duct of claim 1 in a generator having an enclosure comprising a frame assembly and a pair of opposing, substantially symmetrical doors enclosing the frame assembly on a top side of the generator.

8. The exhaust pipe mounted heat duct of claim 1 in a generator having an enclosure with multiple chambers to separate components and manage heat transfer therein.

9. An air duct mounting configuration in an electrical generating apparatus having an alternator therein comprising:
an exhaust pipe operatively coupled to an internal combustion engine, the exhaust pipe having at least one connecting member extending outwards from the exhaust pipe; and
an air duct assembly comprising a first component and a second component, the first component mounted to the at least one connecting member and the first and second component each having a first end and a second end along the length of the air duct;
wherein the first ends are coupled together and the second ends are coupled together such that the air duct assembly surrounds the exhaust pipe forming a cooling air path between the air duct and exhaust pipe along a length of the alternator in the electrical generating apparatus;
wherein the exhaust pipe comprises a support member extending outwards from the pipe;
wherein the second component comprises an opening through which the support member extends to couple to the alternator driven by an engine;
wherein the alternator comprises a flange with an opening for receiving a fastener to couple the support member to the flange; and
wherein the second component comprises a bracket extending outward from the duct and coupled to the flange using the fastener.

10. The air duct mounting configuration of claim 9, wherein the first component and the second component each comprise flanges at the first and the second ends for coupling the first component to the second component.

11. A method of assembling an air duct for a generator comprising:
providing a multi-chamber generator enclosure, an engine within the enclosure, and an alternator driven by the engine and positioned in at least one of the chambers;
providing an exhaust system for the engine having a first connecting member extending outwards from the exhaust system;
providing an air duct assembly comprising an outer section and an inner section, the outer section coupleable to the inner section to form an enclosure through which the exhaust system extends;
coupling the inner section to the first connecting member of the exhaust system;
coupling the exhaust system operatively to the engine so that the exhaust system extends from the engine through the at least one chamber having the alternator;
coupling the outer section to the inner section so that the air duct assembly substantially surrounds the exhaust system in the at least one chamber having the alternator to create a cooling air path between the exhaust system and the air duct assembly; and
coupling a muffler operatively to the exhaust system in a different chamber of the multi-chamber generator enclosure than the at least one chamber having the alternator;
wherein the exhaust system further comprises a support member extending outwards from the exhaust system; and
wherein the inner section comprises an opening for receiving the support member; and
further comprising positioning the support member through the opening and fixing the support member within the at least one chamber having the alternator;
wherein the support member is coupled to the alternator;
wherein the inner section comprises a bracket located adjacent the opening; and
wherein the alternator has a flange coupled to both the bracket and support member.

12. The method of claim 11, wherein the outer section and inner section are coupled at two ends to encircle the exhaust system.

13. The method of claim 12, wherein the outer section and inner section have a flange at each end for coupling the outer section to the inner section.

14. The method of claim 11, wherein the exhaust system has a second connecting member extending outwards from the exhaust system, and
coupling the outer section to the second connecting member of the exhaust system.

15. The method of claim 14, wherein the connecting members have ends that are tapped to receive fasteners and the outer and inner sections have openings to receive the fasteners, the outer and inner sections have surface indentations surrounding the openings to create a surface flush with the ends of the connecting members to support the fasteners.

16. An exhaust pipe mounted heat duct in an electrical generator comprising:
an exhaust pipe coupleable to an internal combustion engine of the electrical generator to receive exhaust therefrom, the exhaust pipe having a first support member and a second support member extending outwards from the exhaust pipe;
a heat duct assembly comprising a first component and a second component, the first component mounted to the first support member and the second component mounted to the second support member, the first component coupled to the second component to substantially surround the exhaust pipe; and
a muffler operatively coupled to the exhaust pipe downstream from the heat duct assembly;
wherein the exhaust pipe mounted heat duct is positioned in a multi-chamber generator enclosure having a partition wall separating at least two chambers; and
wherein the heat duct assembly and the muffler are positioned in separate chambers with the exhaust pipe extending through an opening in the partition wall.

* * * * *